Feb. 17, 1931.  O. ANDERSON  1,792,475
ADJUSTABLE HEADLIGHT
Filed Oct. 2, 1929  2 Sheets-Sheet 2
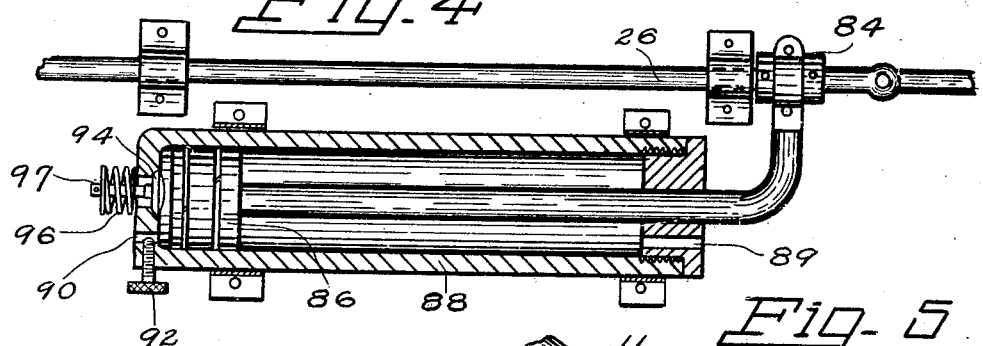
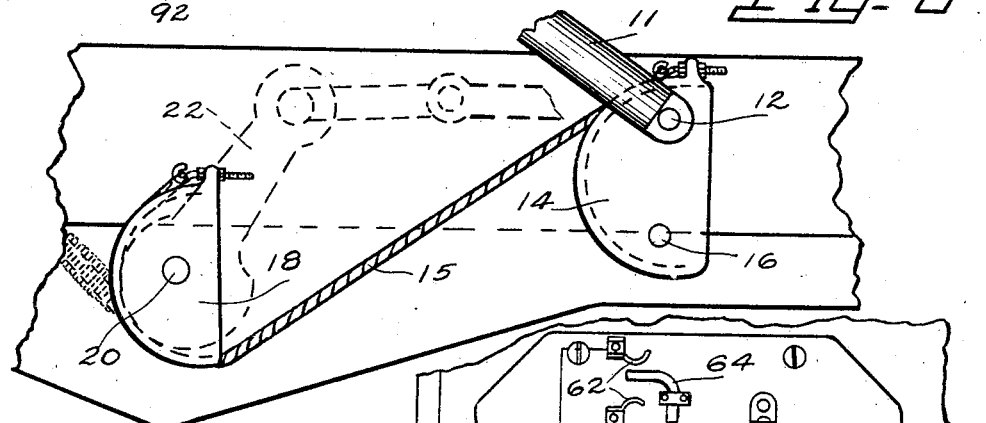
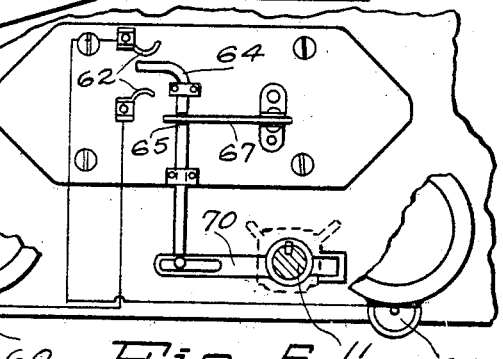
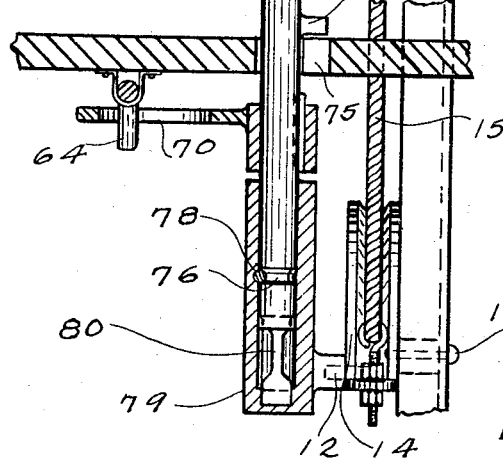
Otto Anderson, Inventor
By Clarence M. Tuck, Attorney Patented Feb. 17, 1931

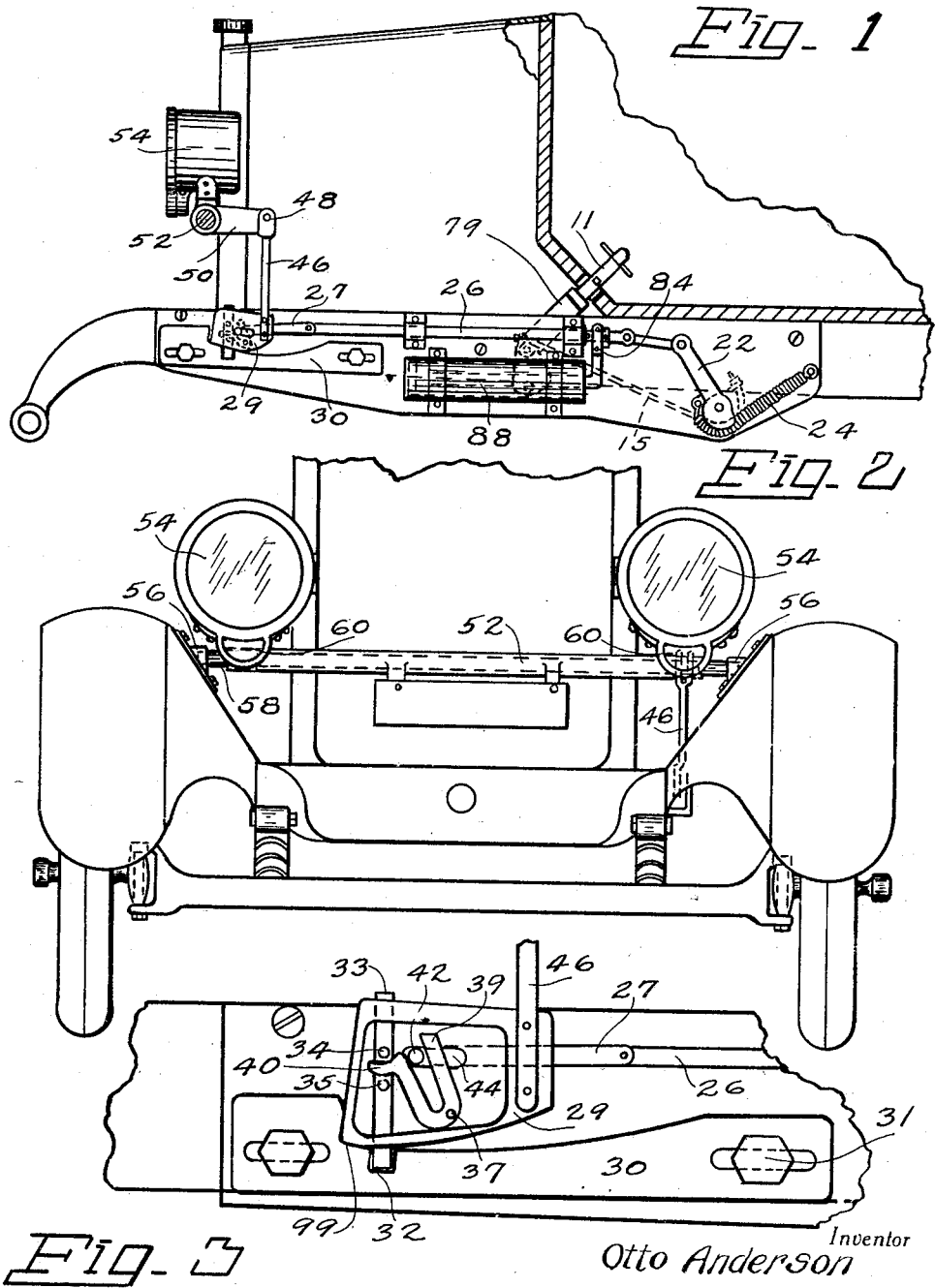

1,792,475

UNITED STATES PATENT OFFICE

OTTO ANDERSON, OF PAULSBO, WASHINGTON

ADJUSTABLE HEADLIGHT

Application filed October 2, 1929. Serial No. 396,647.

My invention relates to the art of automobile headlights and more particularly to that type of headlight which is so adjustable that it is possible, at the will of the operator, to throw the beam of light down when passing another car, and also without additional control means to provide a right and left hand turn signal.

A large number of motor accidents in the past have been caused by the light from an on-coming car momentarily blinding the operator. This is occasioned largely by the fact that the pupil of the eye is normally enlarged when looking into the darkness and in this condition is not prepared for any sudden burst of light. I am aware that headlights have been provided in the past to overcome this deficiency, however I have found that the usual type of headlight that is adjustable from the driver's position is not provided with means which will definitely restore it to, and lock it in its normal operating position.

Some types of lights have been provided which are held against a stop by a spring. In this type the operator must compress the spring in order to depress his lights. I have found the difficulty with this type is that the lights will be dipped and the spring mechanism will restore them to their normal position too quickly. I have found that the lights should be restored to their normal position slowly in order that the operator's eyes may have time to adjust themselves to the new conditions of light.

Another cause of motor accidents can be contributed to the fact that it is very difficult for the driver of an on-coming car to see any hand signals, given as they are behind the source of light, and it is to overcome this deficiency that I have provided as a part of each of my headlights a left and right turn signal, therefore:

The principal object of my invention is to provide a headlight which may be caused to dip its beam.

A further object is to provide a locking means whereby the tiltable lights may be positively locked in their normal operating position.

A further object is to provide means for varying the location of the stop means so that the normal position of the beam may be changed to suit operating conditions or legal requirements.

A still further object is to provide means whereby the return to normal may be automatically controlled to consume any desired length of time.

A still further object is to provide in combination with the tilting headlight described, signal means which may be operated by the same control means and may be made to indicate to an on-coming car that the driver intends to make either a right or left turn.

The above general objects of my invention together with others inherent in the same are obtained by the device illustrated in the following drawings, the same being a preferred form of my invention, throughout which drawings like reference numerals indicate like parts.

Figure 1 is a cross sectional view of an automobile chassis showing my device in elevation.

Figure 2 is a partial front elevation of any automobile showing my device.

Figure 3 is an enlarged detailed view showing the locking mechanism I employ.

Figure 4 is a view partially in section showing the dash pot cylinder I use to slow up my device as it returns to normal.

Figure 5 is an enlarged sectional view showing the means I employ to reverse the direction of effort.

Figure 6 is a fragmentary view showing the switching arrangement used to control the signal lights.

Figure 7 is a fragmentary view partly in section showing the operating rod.

Referring to the drawings, 11 designates the operating rod which is used to operate my device. I have shown it as a foot pedal, however I believe it will be apparent that a hand lever to serve the same purpose might be mounted in any convenient position.

Rod 11 is pivotally connected at 12 to the sheave segment 14 which is in turn pivoted at 16. Secured to one end of the grooved cable way in sheave 14 is the cable 15 which engages in the groove of another sheave segment 18. Sheave segment 18 is secured at its center to the shaft 20 to which in turn is secured the arm 22.

The hub of arm 22 is grooved to accommodate the tension spring 24 which is adapted at all times to restore my headlights and their associated mechanism to their normal operating position. Arm 22 is connected by any convenient means to the pull rod 26 which is in turn connected by the link 27 to the lamp operating member 29. The operating member 29 is provided with an adjustable bearing guide 30 in which is cut a locking notch 32. Notch 32 is adapted to receive the locking bar 33 which has projecting outwardly from it the two pins 34 and 35.

Pivoted at 37 to the operating member 29 is the U-shaped operating dog 39 which has one of its ends bent over at 40 so as to engage the pins 34 and 35. Within the U thus formed is a pin 42 which is secured to the link 27 and is adapted to operate within the slot 44 which is cut in member 29.

Formed either as a part of member 29 or as a separate part fixedly secured to 29 is the upwardly extending bar 46. 46 is pivotally secured at 48 to the arm 50 which in turn is fixedly secured to the revolvable shaft 52. Secured also to the shaft 52 are the headlights 54.

Suitable bearings as 56 provide journals in which the shaft 52 may rotate or a fixed shaft as 58 may be secured in the bearings 56 and a tubular shaft 52 to which the lights are mounted may be slipped over the solid shaft 58 and rotate upon it.

Formed preferably as part of the headlight 54 is a smaller light and reflector 60. These are used for signaling right and left turns and may have the words "right" and "left" on the appropriate light, or, what I have found to be quite satisfactory is to use a green globe in the right hand light and a red one in the left hand light.

Referring to Figure 6 wherein I have indicated a switching arrangement for the signal lights, 62 represents contacts which are singly engageable by the bent over end of the bar 64. Bar 64 is grooved at 65 and is engaged by the spring member 67. This is intended to form the electrical contact between the car frame and member 64 and also to yieldably maintain the bar 64 spaced midway between the contact 62. The spring 67 also forms a restoring means to break the electrical contact as soon as the operating effort is released. Suitably connected to bar 64 is the arm 70 which in turn is slidably secured to the operating rod 11.

In Figure 7 I have shown an enlarged detail of the operating rod 11 which I have shown with the upwardly extending lugs 72 which are conveniently positioned so that the rod 11 may be revolved by inserting the foot between the upturned lugs 72. Extending outwardly from one side of rod 11 is a lug 74 which is adapted to engage a corresponding slot 75 in the foot board of the car. As a matter of convenience I have shown the lower end of rod 11 grooved at 76 and engaged by the pin 78. This permits rod 11 to revolve within the guide member 79 but prevents it moving longitudinally therein.

The extreme lower end of rod 11 is slotted to engage the upper end of a flat tortional spring 80, which in turn is secured in a slot at its lower end in the guide member 79.

In Figure 4 I have shown a means which I have found quite satisfactory and which I employ to slow up the return of my device to normal, which is effected by the spring 24. This consists of a piston rod fixedly secured to the pull rod 26 at 84 and having at its other end a piston 86 of any suitable type. The piston 86 operates within the dash pot cylinder 88 which is vented at 89 and 90. The vent 90 is controlled by any convenient means as the screw 92. An air intake valve 94 is provided having a valve spring 96 which must be equipped with suitable retaining washers as indicated at 97.

*Method of operation*

When it is desired to dip or tilt the rays of the headlights downwardly as in passing an on-coming car, the operator's foot is placed between the upwardly extending lug 72 on the operating rod 11 and downward pressure is exerted. The lug 74 prevents the rod 11 from turning and the action is to revolve the sheave segment 14 about its pivot 16 thus pulling on the cable 15 which in turn revolves the sheave segment 18 about its center 20 in the reverse direction moving arm 22 rearwardly carrying with it the pull rod 26 together with the dash pot piston 86 which is fixedly secured thereto.

As soon as the rearward movement of rod 26 has taken up the slack it operates to revolve the U-shaped dog 39 about its pivot 37 and causes the bent over end 40 to engage the pin 34. This causes the locking bar 33 to move upwardly and be withdrawn from its locking notch 32.

As the pull rod 26 continues its rearward movement pin 42 engages the rear end of its slot 44 and thus cause the entire operating member 29 to move rearwardly. The operating member however is pivoted at 48, consequently a continued rearward movement causes the point 99 of member 29 to slide along the upper surface of member 30. This produces, in effect, an elongation of the upwardly extending member 46 which in turn raises the pivot end 48. This action through the arm 50 and the shaft 52 causes a partial revolution of the lights 54 about their support 58 and thus directs the beam from the light 54 downwardly. As soon as the pressure is withdrawn from the operating rod 11, spring 24 tends to restore the entire mechanism to its normal position as shown in Figure 1.

This restoring action, however, is retarded by the dash pot cylinder and its co-acting piston 86. As the pull rod 26 was moved rearwardly to the extreme end of its travel, piston 86, which moved with it drew in a charge of air through valve 94, consequently spring 24 in addition to restoring the operating mechanism to its normal position must force the air thus drawn in out of the vent 90. The period required for this operation may be controlled by means of the adjustable screw 92 which is so positioned as to cut off a portion of the effective area of vent 90.

I have found it desirable at times to change slightly the position of the locking bar 33 in order that the lights 54 may be directed downwardly in a manner either desired by the operator or as may be required by law.

This can easily be accomplished by lossening the screw 31 and moving member 30 to the desired position and again tightening the bolt 31.

When it is desired to operate the signal lights 60, the operator's foot is again placed between the lugs 72 on the operating rod 11 and a twisting movement imparted to the rod. As soon as a slight turning of the rod is accomplished, lug 74 will engage the upper surface of the floor board and prevent any tilting of the lights. As rod 11 is turned further, bar 64 will be moved by the arm 70 until it contacts the desired one of contacts 62. As soon as need of the signal has passed the foot may be removed from rod 11 and spring 79 assisted by the spring member 67 will restore the switching mechanism to normal, thus breaking the electrical connection.

Other details of the operation and construction of my invention would be so obvious to those skilled in the art that I believe that no further description is necessary. Manifestly, changes may be made in the form, proportion, and arrangements of parts of my invention without departing from the spirit thereof.

What I claim is—

1. In an adjustable headlight the combination of a tiltable mounted headlight, an operating member, means for locking said operating member in its normal position, manually controlled means for actuating said operating member, means for restoring the headlight to its normal position, and means adapted to slow up said return to normal.

2. In an adjustable headlight the combination of a tiltable mounted headlight, an operating member, means for locking said operating member in its normal position, manually controlled means for actuating said operating member, means for restoring the headlight to its normal position, means adapted to slow up said return to normal, and means permitting the changing of the normal position.

3. In a safety headlight of the class described the combination of a tiltable headlight having attached thereto a turn signal light, and operating member for said headlight, locking means for said headlight, means permitting a changing of the locked position of said headlight, manual means adapted to operate said headlight, means for restoring the headlight to its normal or locked position, and means adapted to slow up the return to the locked position.

4. In a safety headlight of the class described the combination of a tiltable headlight having attached thereto a turn signal light, an operating member for said headlight, locking means for said headlight, means permitting a changing of the locked position of said headlight, manual means adapted to operate both the headlight and the signal light, and having an operating rod capable of longitudinal and rotary movement, means for restoring the headlight to its normal or locked position, and a guide for said rod having a slot therein which co-acts with a lug on the operating rod to prevent accidental turning of the rod as it is moved longitudinally.

5. In a safety headlight of the class described the combination of a tiltable headlight having attached thereto a turn signal light, an operating member for said headlight, locking means for said headlight, means permitting a changing of the locked position of said headlight, manual means adapted to operate both the headlight and the signal light, and having an operating rod capable of longitudinal and rotary movement, means for restoring the headlight to its normal or locked position, a guide for said rod having a slot therein which co-acts with a lug on the operating rod to prevent accidental turning of the rod as it is moved longitudinally, a piston secured to said manual means, and a dash pot cylinder co-acting with said piston to slow up the return of the lights to their normal position.

6. In a safety headlight of the class described the combination of a tiltable headlight having attached thereto a turn signal light, an operating member for said headlight, locking means for said headlight, means permitting a changing of the locked position of said headlight, manual means adapted to operate both the headlights and the signal light, and having an operating rod capable of longitudinal and rotary movement, means for restoring the headlight to its normal or locked position, switching means for said signal lights, means connected to said rod transmitting the longitudinal motion to the headlight, additional means transmitting the rotary motion to the said switching means, a piston secured to said manual means, and a dash pot cylinder co-acting with said piston to slow up the return of the lights to their normal position.

In witness whereof, I hereunto subscribe my name this 4th day of September, A. D. 1929.

OTTO ANDERSON.